US00RE45918E

(19) United States
(12) Reissued Patent
Saisho et al.

(10) Patent Number: US RE45,918 E
(45) Date of Reissued Patent: Mar. 8, 2016

(54) OPTICAL SCANNING APPARATUS, OPTICAL WRITING APPARATUS, AND IMAGE FORMING APPARATUS

(71) Applicant: Ricoh Company, Limited, Ohta-ku, Tokyo (JP)

(72) Inventors: Kenichiroh Saisho, Kanagawa (JP); Kohji Sakai, Tokyo (JP)

(73) Assignee: RICOH COMPANY, LIMITED, Tokyo (JP)

(21) Appl. No.: 13/721,099

(22) Filed: Dec. 20, 2012

Related U.S. Patent Documents

Reissue of:
(64) Patent No.: 7,876,486
Issued: Jan. 25, 2011
Appl. No.: 11/714,116
Filed: Mar. 6, 2007

(30) Foreign Application Priority Data

Mar. 8, 2006 (JP) ..... 2006-062983
Mar. 14, 2006 (JP) ..... 2006-069460

(51) Int. Cl.
*G02B 26/08* (2006.01)
*G02B 26/12* (2006.01)

(52) U.S. Cl.
CPC ..... *G02B 26/125* (2013.01)

(58) Field of Classification Search
CPC ..... H04N 2201/04744; H04N 2201/04748; H04N 1/1135; G02B 26/123; G02B 26/125
USPC ..... 359/204.1–204.4, 205.1, 206.1; 347/233–235, 243–244, 258–261, 250; 250/234–236
See application file for complete search history.

(56) References Cited

U.S. PATENT DOCUMENTS

| | | | |
|---|---|---|---|
| 5,233,454 | A | 8/1993 | Sakuma et al. |
| 5,305,022 | A | 4/1994 | Ota et al. |
| 5,355,244 | A | 10/1994 | Suzuki et al. |
| 5,408,095 | A | 4/1995 | Atsuumi et al. |
| 5,426,298 | A | 6/1995 | Sakuma et al. |
| 5,459,601 | A | 10/1995 | Suzuki et al. |
| 5,475,522 | A | 12/1995 | Itabashi et al. |
| 5,504,613 | A | 4/1996 | Itabashi et al. |
| 5,546,216 | A | 8/1996 | Suzuki |
| 5,684,618 | A | 11/1997 | Atsuumi |
| 5,717,511 | A | 2/1998 | Suzuki |
| 5,815,301 | A | 9/1998 | Naiki et al. |
| 5,875,051 | A | 2/1999 | Suzuki et al. |

(Continued)

FOREIGN PATENT DOCUMENTS

| | | |
|---|---|---|
| JP | 03-081720 | 4/1991 |
| JP | 03-131817 | 6/1991 |

(Continued)

*Primary Examiner* — James Phan
(74) *Attorney, Agent, or Firm* — Harness, Dickey & Pierce, P.L.C.

(57) ABSTRACT

F-theta lenses, included in scanning lens systems, are arranged on a main scanning plane facing an optical deflector and substantially linearly symmetrically on the main scanning plane with reference to a rotational center of the optical deflector. Each f-theta lens has a no-power portion in the main scanning direction. Synchronization-detecting light passes through the no-power portion of the f-theta lens, thus enabling reduction in color shift due to temperature variation in an image forming apparatus without increasing the cost and complexity in controlling color shift.

18 Claims, 11 Drawing Sheets

(56) References Cited

U.S. PATENT DOCUMENTS

| | | | | |
|---|---|---|---|---|
| 5,986,791 | A | 11/1999 | Suzuki et al. | |
| 5,999,345 | A | 12/1999 | Nakajima et al. | |
| 6,046,835 | A | 4/2000 | Yamawaki et al. | |
| 6,069,724 | A | 5/2000 | Hayashi et al. | |
| 6,078,419 | A | 6/2000 | Atsuumi | |
| 6,081,386 | A | 6/2000 | Hayashi et al. | |
| 6,104,522 | A | 8/2000 | Hayashi et al. | |
| 6,130,768 | A | 10/2000 | Ono | |
| 6,141,133 | A | 10/2000 | Suzuki et al. | |
| 6,166,842 | A | 12/2000 | Aoki et al. | |
| 6,185,026 | B1 | 2/2001 | Hayashi et al. | |
| 6,188,086 | B1 | 2/2001 | Masuda et al. | |
| 6,198,563 | B1 | 3/2001 | Atsuumi | |
| 6,222,662 | B1 | 4/2001 | Suzuki et al. | |
| 6,233,081 | B1 | 5/2001 | Suzuki et al. | |
| 6,256,133 | B1 | 7/2001 | Suzuki et al. | |
| 6,288,819 | B1 | 9/2001 | Aoki et al. | |
| 6,317,246 | B1 | 11/2001 | Hayashi et al. | |
| 6,347,004 | B1 | 2/2002 | Suzuki et al. | |
| 6,348,988 | B2 | 2/2002 | Aoki et al. | |
| 6,348,989 | B2 | 2/2002 | Aoki et al. | |
| 6,359,717 | B2 | 3/2002 | Suzuki et al. | |
| 6,366,384 | B1 | 4/2002 | Aoki et al. | |
| 6,376,837 | B1 | 4/2002 | Itabashi et al. | |
| 6,384,949 | B1 | 5/2002 | Suzuki | |
| 6,388,792 | B1 | 5/2002 | Atsuumi et al. | |
| 6,400,391 | B1 | 6/2002 | Suhara et al. | |
| 6,417,509 | B1 | 7/2002 | Atsuumi et al. | |
| 6,445,483 | B2 | 9/2002 | Takada et al. | |
| 6,448,998 | B1 | 9/2002 | Suzuki et al. | |
| 6,498,617 | B1 | 12/2002 | Ishida et al. | |
| 6,509,995 | B1 | 1/2003 | Suzuki et al. | |
| 6,596,985 | B2 | 7/2003 | Sakai et al. | |
| 6,621,512 | B2 | 9/2003 | Nakajima et al. | |
| 6,657,761 | B2 | 12/2003 | Suzuki et al. | |
| 6,731,317 | B2 | 5/2004 | Ema et al. | |
| 6,771,407 | B2 | 8/2004 | Hayashi et al. | |
| 6,781,729 | B2 | 8/2004 | Suzuki et al. | |
| 6,785,028 | B1 | 8/2004 | Atsuumi et al. | |
| 6,791,596 | B2 | 9/2004 | Nihei et al. | |
| 6,791,729 | B2 | 9/2004 | Atsuumi et al. | |
| 6,829,104 | B2 | 12/2004 | Suzuki et al. | |
| 6,833,940 | B2 | 12/2004 | Suzuki et al. | |
| 6,856,335 | B2 | 2/2005 | Ono | |
| 6,856,438 | B2 | 2/2005 | Takanashi et al. | |
| 6,870,652 | B2 | 3/2005 | Suhara et al. | |
| 6,903,855 | B2 | 6/2005 | Aoki et al. | |
| 6,903,856 | B2 | 6/2005 | Hayashi | |
| 6,917,639 | B2 | 7/2005 | Ishida et al. | |
| 6,919,978 | B2 | 7/2005 | Kudo | |
| 6,961,164 | B2 | 11/2005 | Atsuumi | |
| 6,999,208 | B2 | 2/2006 | Suzuki et al. | |
| 7,006,120 | B2 | 2/2006 | Sakai et al. | |
| 7,006,271 | B2 | 2/2006 | Ono et al. | |
| 7,034,973 | B2 | 4/2006 | Sakai | |
| 7,038,822 | B2 | 5/2006 | Sakai et al. | |
| 7,045,773 | B2 | 5/2006 | Suzuki et al. | |
| 7,057,782 | B2 | 6/2006 | Kudo | |
| 7,061,658 | B2 | 6/2006 | Suzuki | |
| 7,068,407 | B2 | 6/2006 | Sakai et al. | |
| 7,088,485 | B2 | 8/2006 | Suzuki | |
| 7,106,483 | B2 | 9/2006 | Hayashi et al. | |
| 7,215,354 | B1 | 5/2007 | Sakai et al. | |
| 7,245,409 | B2 * | 7/2007 | Tamaru | 359/218.1 |
| 7,256,815 | B2 | 8/2007 | Suzuki et al. | |
| 7,271,823 | B2 | 9/2007 | Izumi et al. | |
| 7,277,212 | B2 | 10/2007 | Miyatake et al. | |
| 7,330,296 | B2 | 2/2008 | Sakai | |
| 7,333,254 | B2 | 2/2008 | Amada et al. | |
| 7,450,274 | B2 | 11/2008 | Itabashi et al. | |
| 2003/0112486 | A1 * | 6/2003 | Kudo | 359/216 |
| 2004/0141219 | A1 * | 7/2004 | Ono et al. | 359/204 |
| 2004/0184127 | A1 | 9/2004 | Nakajima et al. | |
| 2004/0196507 | A1 | 10/2004 | Sakai | |
| 2006/0077500 | A1 | 4/2006 | Hayashi et al. | |
| 2006/0187294 | A1 | 8/2006 | Saisho et al. | |
| 2006/0284968 | A1 | 12/2006 | Hayashi et al. | |
| 2007/0053040 | A1 * | 3/2007 | Sakaue et al. | 359/204 |

FOREIGN PATENT DOCUMENTS

| | | |
|---|---|---|
| JP | 04-175718 | 6/1992 |
| JP | 05-046005 | 2/1993 |
| JP | 05-289008 | 11/1993 |
| JP | 08-297256 | 11/1996 |
| JP | 09-184976 | 7/1997 |
| JP | 10-010445 | 1/1998 |
| JP | 10-197823 | 7/1998 |
| JP | 11-311749 | 11/1999 |
| JP | 2000-121983 | 4/2000 |
| JP | 2000-214405 | 8/2000 |
| JP | 2002-090672 | 3/2002 |
| JP | 2002-098921 | 4/2002 |
| JP | 3293345 | 4/2002 |
| JP | 2002-131664 | 5/2002 |
| JP | 2003-185952 | 7/2003 |
| JP | 2004-21171 | 1/2004 |
| JP | 2005-099336 | 4/2005 |

* cited by examiner

B: SINGLE-END DETECTION - ROTATIONALLY SYMMETRICAL ARRANGEMENT

C: SINGLE-END DETECTION - LINEARLY SYMMETRICAL ARRANGEMENT -NO-POWER PORTION PRESENT

D: SINGLE-END DETECTION- ROTATIONALLY SYMMETRICAL ARRANGEMENT -NO-POWER PORTION PRESENT

OPTICAL SCANNING APPARATUS, OPTICAL WRITING APPARATUS, AND IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present document incorporates by reference the entire contents of Japanese priority document, 2006-062983 filed in Japan on Mar. 8, 2006 and 2006-069460 filed in Japan on Mar. 14, 2006.

BACKGROUND OF THE INVENTION

1. Field of the Invention

The present invention relates to an image forming apparatus such as a multi function peripheral or a plotter that includes at least two of the following, namely, an optical scanning apparatus that scans a scanning surface, an optical writing apparatus that includes the optical scanning apparatus, a copying machine that includes the optical writing apparatus, a printer, and a fax machine.

2. Description of the Related Art

Optical scanning apparatuses are widely known in relation to digital copying apparatuses and laser printers. Optical scanning apparatuses employ scanning optical system, which involves focusing optical beams deflected by an optical deflector to form a beam spot on a scanning surface.

In an optical writing apparatus or an image forming apparatus that includes an optical scanning apparatus, there is a tendency for the optical performance to deteriorate due to reduced tolerance of the optical element, expansion/contraction of the optical element due to temperature variation, etc. A stable optical performance is thus desirable alongside a small beam spot diameter.

A stable optical performance can be attained by including an adjustment mechanism in the optical element. However, this method is neither cost-effective nor space-effective.

Stability particularly is sought with regard to the position of the beam spot of different colors in a main scanning direction. A multi-color image clearly shows degradation if the beam spots of all the colors do not form at the same spot.

The position of the beam spot in the main scanning direction can be stabilized, by adjusting the write timing. Synchronization detection method is well known as a method for electrically adjusting a write-start timing and involves providing a photo sensor in all parts except those used for writing.

In synchronization detection method, photoreception can be performed at one end of a scan line or both ends of the scan line. The latter method can be expected to considerably reduce non-coincidence of the beam spots in the main scanning direction as a standard for the write start timing is set at both ends of the scan line. However, in a color image forming apparatus producing color images, two photo sensors would be required per scanning optical system (for each color), increasing the number of components in terms of the photo sensors as well as electrical control boards for the photo sensors.

A technology thus is sought to enable adjustment of the write start timing using as few photo receptors as possible.

Again stability is desirable in the light beam used in detecting synchronization (hereinafter, "synchronization-detecting light") as it is taken as a standard for the write start timing. However, even the synchronization-detecting light that reaches the photo sensor is affected by the deterioration of the optical performance of the scanning lens due to reduced tolerance, temperature variation, and the like.

In the optical scanning apparatus disclosed in Japanese Patent Application Laid-open No. 2002-98921, a notch is provided at an end of the scanning lens for the passage of the synchronization-detecting light, so that the synchronization-detecting light does not pass through the scanning lens and be adversely affected by the expansion and contraction of the scanning lens.

In the optical scanning apparatus disclosed in Japanese Patent Application Laid-open No. 3293345, a rib is provided for the passage of the synchronization-detecting light, again so that the synchronization-detecting light does not pass through the scanning lens and be adversely affected by the expansion and contraction of the scanning lens.

In an apparatus with optical writing as its principal functionality, the synchronous optical systems need to be placed where they will not interfere with the parts performing optical writing. This puts a constraint on the freedom in designing, especially with increasing demand for low-cost and compact optical scanning apparatus. Particularly, this constraint necessitates the length of the synchronous optical system path to be increased, leading to less than ideal conditions for photoreception.

A method is disclosed in Japanese Patent Application Laid-open No. H3-81720 wherein a synchronization mirror which forms a synchronization optical system and a synchronization detecting unit are coupled within a sub-scanning cross-section.

The synchronization-detecting light only reduces the shift of the beam spots of each color individually in the main scanning direction and by no means addresses the shift of the beam spots between different colors.

To obtain a high quality image, merely reducing the shift of the beam spot of each color individually in the main scanning direction is not enough, but it is also necessary for the optical scanning apparatus and the optical writing apparatus to be able to reduce the shift in the beam spots of different colors (hereinafter, "color shift") in the main scanning direction, and not allow color shift due to temperature variation.

The layout constraint encountered in a quest to make the scanning optical systems compact cannot be bypassed only in the method disclosed in Japanese Patent Application Laid-open No. H3-81720.

SUMMARY OF THE INVENTION

It is an object of the present invention to at least partially solve the problems in the conventional technology.

According to an aspect of the present invention, an optical scanning apparatus includes 2n (where n≥1) light sources, each light source including m (where m≥1) light emitting units; a synchronization detecting unit that receives m×n light beams from the light sources, scans a scanning surface by the light beams emitted by 2n light sources, and determines a write timing for writing to the scanning surface, the light beams being substantially symmetrical with respect to a sub-scanning cross-section that includes a rotational axis of an optical deflector; and a first scanning lens system and a second scanning lens system arranged facing each other on either side of optical deflector and causing m light beams to perform imaging on the respective scanning surfaces, wherein synchronization detection by the synchronization detecting unit is performed at one end of each scan line, and the first scanning lens system and the second scanning lens system are arranged substantially symmetrically with reference to a line in a main scanning direction orthogonal to the rotational axis of the optical deflector.

According to another aspect of the present invention, an optical scanning apparatus includes an optical deflector that deflects light beams emitted by a light source in a main scanning direction; a scanning lens system that focuses the light beams deflected by the optical deflector on a scanning surface as a beam spot; a synchronization detecting unit that determines a write timing for writing to the scanning surface; and a synchronization optical system that includes at least one converging unit that converges the light beams on the synchronization detecting unit, wherein the converging unit that contributes the most to a sub-scanning position shift by the synchronization detecting unit and the synchronization detecting unit are coupled within a sub-scanning cross-section and a condition $D>Z/2$ is satisfied, where D is a beam diameter at a light-receiving unit of the synchronization detecting unit, and Z is a light-receiving zone of the light-receiving unit in a sub-scanning direction.

According to still another aspect of the present invention, an optical writing apparatus includes a plurality of optical scanning apparatuses, each optical scanning apparatus including, 2n (where $n\geq1$) light sources, each light source including m (where $m\geq1$) light emitting units; a synchronization detecting unit that receives $m\times n$ light beams from the light sources, scans a scanning surface by the light beams emitted by 2n light sources, and determines a write timing for writing to the scanning surface, the light beams being substantially symmetrical with respect to a sub-scanning cross-section that includes a rotational axis of an optical deflector; and a first scanning lens system and a second scanning lens system arranged facing each other on either side of optical deflector and causing m light beams to perform imaging on the respective scanning surfaces, wherein synchronization detection by the synchronization detecting unit is performed at one end of each scan line, and the first scanning lens system and the second scanning lens system are arranged substantially symmetrically with reference to a line in a main scanning direction orthogonal to the rotational axis of the optical deflector, wherein synchronization-detecting light of only one optical scanning apparatus is detected, and write timings of the other optical scanning apparatuses is electrically estimated based on detection signals of detected synchronization-detecting light.

According to still another aspect of the present invention, an image forming apparatus includes the above optical scanning apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

Four combinations are possible with regard to the portion of a scanning lens through which the synchronization-detecting light passes (hereinafter, "synchronization-detecting-light passage portion") and arrangement of scanning optical systems, based on the presence or absence of power in the synchronization-detecting-light passage portion and linearly symmetrical or rotationally symmetrical arrangement of the scanning optical systems. The four combinations are given below in Table 1.

TABLE 1

| Presence/absence of power in Synchronization-detecting-light passage portion/ Arrangement of scanning optical systems | Linearly symmetrical | Rotationally symmetrical |
|---|---|---|
| Power present | A | B |
| Power absent | C | D |

Each of the combinations A to D is considered under an assumption that temperature variation on, either side of an optical deflector is uniform (hereinafter, "uniform temperature variation").

Figure 2:
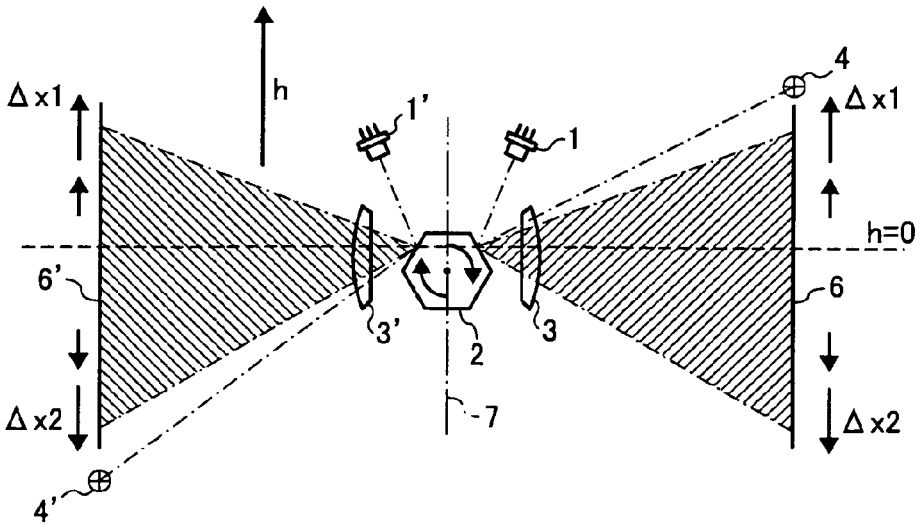
FIG. 2 is a schematic of an optical scanning apparatus according to a first embodiment of the present invention having a linearly symmetrical arrangement.
Figure 3:
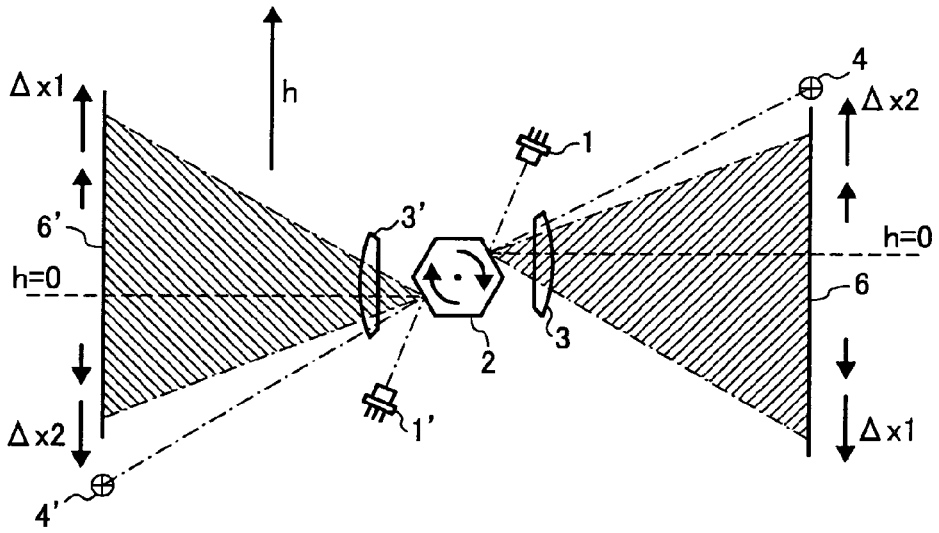
FIG. 3 is a schematic of an optical scanning apparatus having a rotationally symmetrical arrangement.

In FIG. 2 and FIG. 3, image height h is mapped upward, and $\Delta x$ represents the position shift in a main scanning direction (hereinafter, "main scanning position shift") due to temperature variation. When performing synchronization detection on both sides, there are methods for detecting a scanning-start end and a scanning-stop end. As the scanning-stop end is considered as a scanning-start end for scanning by the next surface of the optical deflector, the argument is carried forth by focusing on sensing of the scanning-start end.

For the sake of simplicity, it is assumed that the rise in the temperature in an optical scanning apparatus according to the present embodiment is uniform. In other words, it is assumed that the thermal expansion of the scanning lens on either side of the optical deflector is uniform.

The color shift produced due to the deformation of the scanning lenses due to temperature variation is assessed in each of the four cases A to D.

FIG. 2 is a schematic of an optical layout when the scanning optical systems are arranged linearly symmetrically (Case A and Case C in Table 1). In FIG. 2, the reference numerals 1 and 1' represent light sources, 2 represents an optical deflector (such as a polygon mirror), 3 and 3' represent f-theta lenses which are the scanning lenses that form a scanning lens system, 4 and 4' represent synchronization detecting units, and 6 and 6' represent scanning surfaces.

The f-theta lenses 3 and 3' are arranged on the main scanning direction facing the optical deflector 2, and substantially linearly symmetrically on a main scanning plane with reference to a rotational center 7 of the optical reflector 2.

As the f-theta lenses 3 and 3' are arranged substantially linearly symmetrically, the main scanning position shift in one scanning optical system can be taken as $\Delta\times1$ on a positive side of the image height h, and the main scanning position shift in the other scanning optical system can be taken as $\Delta\times2$ on a negative side of the image height h.

Between Case A and Case C shown in Table 1, the light beam reaching the synchronization detecting units 4 and 4' may or may not be affected by the temperature variation.

FIG. 3 is a schematic of an optical layout when the scanning optical systems are arranged rotationally symmetrically (Case B and Case D in Table 1). As the scanning lenses 3 and 3' are arranged rotationally symmetrically, on a write-end side, the main scanning position shift in the scanning optical system can be taken as $\Delta\times1$, and on a write-start side, the main scanning position shift in the scanning optical system can be taken as $\Delta\times2$.

The difference between Case B and Case D shown in Table 1 is that in Case B the light beam reaching the synchronization detecting units 4 and 4' is affected by temperature variation and Case D, the light beam reaching the synchronization detecting units 4 and 4' is not affected by temperature variation.

Figure 1:
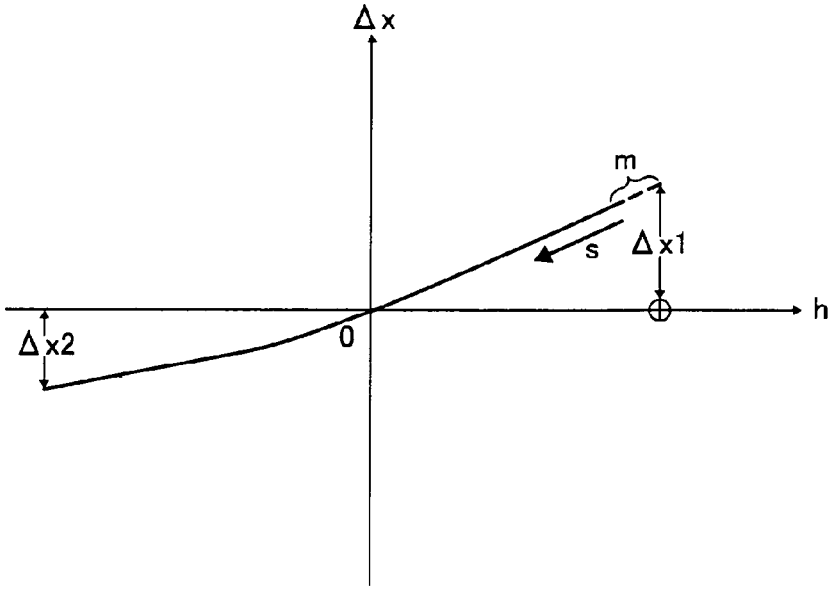
FIG. 1 is a graph for explaining a main scanning position shift.

As shown in FIG. 1, the main scanning position shift can be described in terms of the image height h. In FIG. 1 (as in other drawings), an arrow S represents a scanning direction, and the portion of the scan line represented by a dashed line m represents a non-emitting portion of the light source.

In Case A, the synchronization-detecting light passing through the scanning optical system produces a position shift of $\Delta\times1$ in one scanning optical system and $\Delta\times2$ in the opposite direction in the other scanning optical system. Consequently, the main scanning position shift caused by the scanning optical systems on the two sides resembles the graph shown in FIG. 4, which is essentially the graph shown in FIG. 1 shifted upward by $\Delta\times1$ and downward by $\Delta\times2$.

Figure 4:
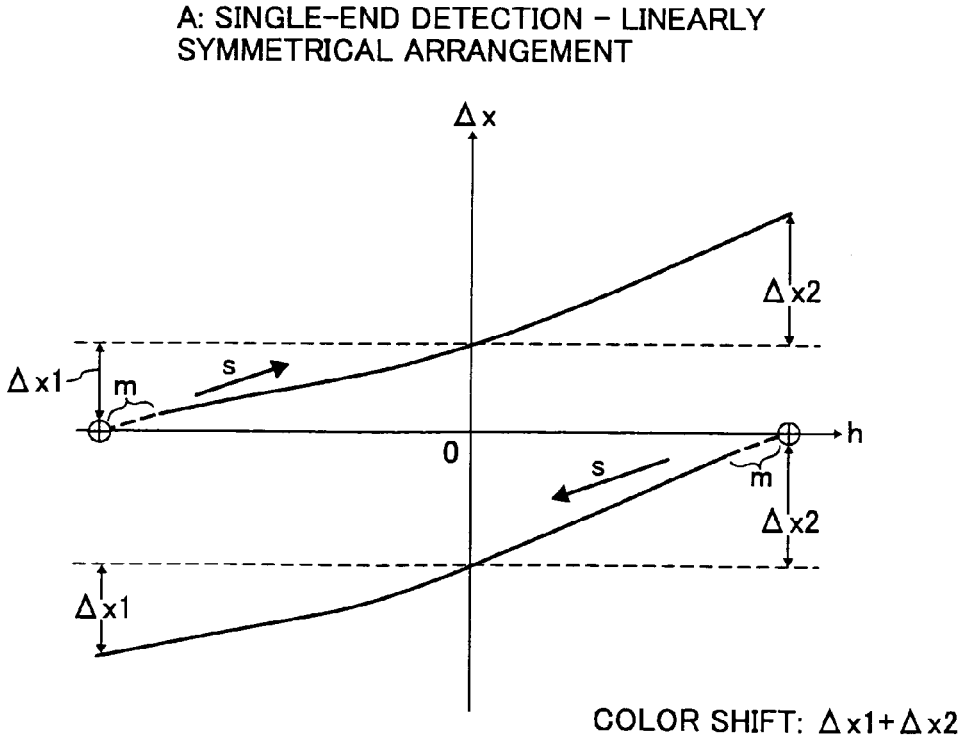
FIG. 4 is a graph for explaining the main scanning position shift in the linearly symmetrical arrangement.

The color shift is the difference between the graph shown in FIG. 1 and the graph shown in FIG. 4, and is thus $\Delta\times1+\Delta\times2$.

Figure 5:
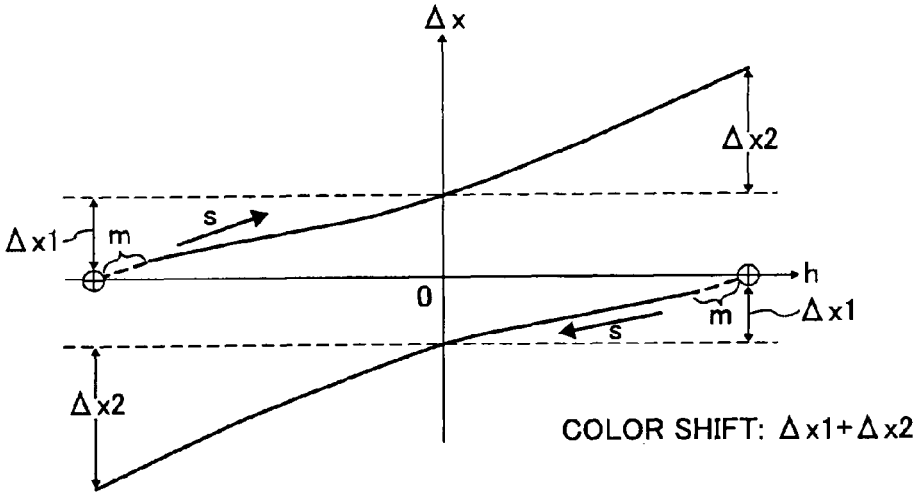
FIG. 5 is a graph for explaining the main scanning position shift in the rotationally symmetrical arrangement.

In Case B, a position shift of $\Delta\times1$ is produced in the synchronization-detecting light passing through both the scanning optical systems but in the opposite directions. Consequently, the main scanning position shift caused by the scanning optical systems on the two sides resembles the graph shown in FIG. 5, which is essentially the graph shown in FIG. 1 shifted upward and downward by $\Delta\times1$. The color shift is the difference between the graph shown in FIG. 1 and the graph shown in FIG. 4, and is thus $\Delta\times1+\Delta\times2$.

In Case A and Case B, the synchronization-detecting light is affected by the deformation of the scanning lens. Consequently, even if the scanning optical systems are arranged symmetrically with respect to the optical deflector 2, color shift of a magnitude of the sum of the main scanning position shift at the two ends of the scan line ($\Delta\times1+\Delta\times2$) is bound to occur. This shows that mere symmetrical arrangement of the scanning optical systems is not adequate to reduce color shift.

Figure 6:
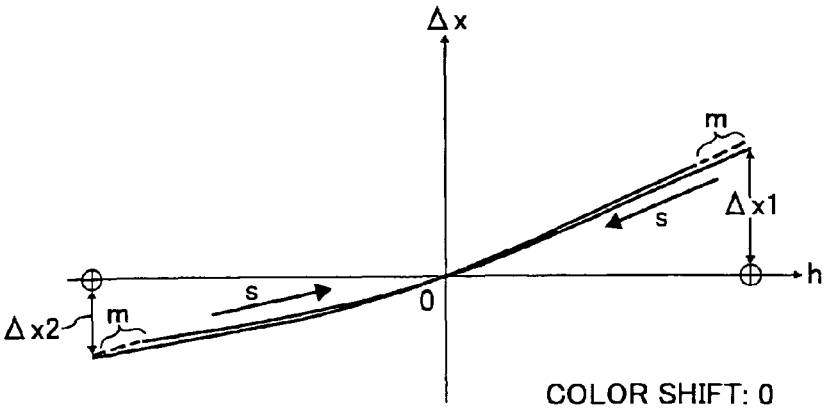
FIG. 6 is a graph for explaining the main scanning position shift when the arrangement is linearly symmetrical and a synchronization-detecting-light passage portion has no power.

In Case C, temperature variation does not cause position shift in the synchronization-detecting light in either scanning optical system. Consequently, the main scanning position shift caused by the scanning optical systems on the two sides resembles the graph shown in FIG. 6, which is essentially similar to the graph shown in FIG. 1. Thus, there is virtually no color shift in this case.

In Case D too, temperature variation does not cause position shift in the synchronization-detecting light in either scanning optical system.

Figure 7:
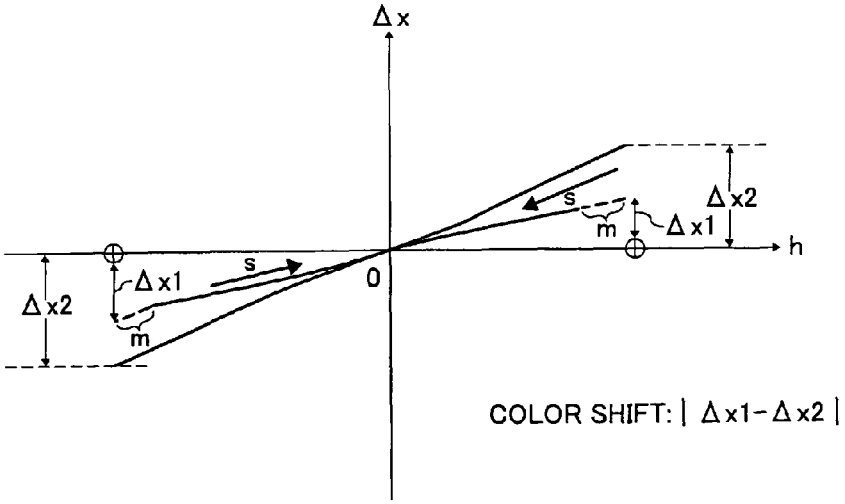
FIG. 7 is a graph for explaining the main scanning position shift when the arrangement is rotationally symmetrical and the synchronization-detecting-light passage portion has no power.

In Case D, the main scanning position shift caused by the scanning optical systems on the two sides will be the reverse of one another, and consequently resemble the graph shown in FIG. 7, which is essentially the graph shown in FIG. 1, only reversed.

In Case D, a color shift of the magnitude of $\Delta\times1-\Delta\times2$ will be produced.

It can be surmised that even in Case D where the synchronization-detecting light is not affected by temperature variation, a perfectly symmetrical main scanning position shift does not occur at zero image height h (that is, at h=0).

Thus, it can be concluded theoretically that Case C is the only case where color shift is minimized by a combination of arrangement of the scanning optical systems in an opposing scanning method and absence of power in the synchronization-detecting-light passage portion.

In actuality, temperature variation is seldom uniform within the optical scanning apparatus. Hence, let us assume that, of the two scanning optical systems, temperature variation occurs only in one. It stands to reason in terms of FIGS. 4 to 7 that the main scanning position shift of one of the scanning optical systems will be zero.

Therefore, in Cases A to D, the color shift would be of the magnitude of at least $\Delta\times1$ or $\Delta\times2$.

In other words, when the temperature variation is not uniform, the combination of arrangement of the scanning optical systems and absence of power in the synchronization-detecting-light passage portion yields poor results.

Based on the study described above, the scanning optical systems in the present embodiment are of the type represented by Case C of Table 1 wherein the combination of the arrangement of the scanning optical systems and presence or absence of power in the synchronization-detection-light passage portion of the scanning lens is used for minimizing color shift due to temperature variation, assuming that the temperature variation is uniform on either side of the optical deflector 2.

Thus, the optical scanning apparatus according to the present embodiment has the configuration shown in FIG. 2. That is, the optical scanning apparatus is of an opposing scanning type having two scanning optical systems that focus the light beam deflected by the optical deflector 2 on the scanning surfaces 6 and 6' as beam spots. The salient feature of optical scanning apparatus is described below.

The optical scanning apparatus according to the present embodiment includes 2n (where n≥1) light sources, each light source having m (where m≥1) light-emitting units, synchronization detecting units, and scanning lens systems. The synchronization detecting units receive the incident m×n light beams of the slight sources which are symmetrical with respect to a sub-scanning cross-sectional surface that include a rotational axis of the optical deflector 2, scan the scanning surface by the light beams, and determine a write timing for writing on the scanning surface. The scanning lens systems focus the light beams on the scanning surfaces facing the optical deflector 2.

Synchronization detection in the optical scanning apparatus according to the present embodiment is performed at only one end of each scan line, and the scanning lens systems are arranged substantially linearly symmetrically with respect to a main scanning direction and orthogonal to the rotational axis of the optical deflector 2. The shift due to temperature variation in the beam spot position of the synchronization-detecting light in the main scanning direction on the scanning surfaces or their equivalent in the optical scanning apparatus according to the present embodiment is of the magnitude of 5 μm/° C. or less.

The magnitude of 5 μm/° C. or less is not an unambiguous result for Case C of Table 1 and is only a possibility.

The scanning optical systems facing the center of the optical deflector 2 are substantially linearly symmetrical with respect to the rotational center of the optical deflector 2 in the main scanning direction orthogonal to a rotational axis of the optical deflector 2, and hence the arrangement is termed "linearly symmetrical arrangement".

The color shift can be minimized of the magnitude of the beam spot position shift due to temperature variation that occurs as a matter of course in an optical writing apparatus is 5 μm/° C. or less.

Even though the actual temperature variation in an optical writing apparatus is seldom uniform, the closed space of the optical writing apparatus does not allow for too much variation in temperature distribution, enabling realization of the favorable result specified for Case C.

In the optical scanning apparatus according to the present embodiment, it is preferable for a no-power portion of the scanning lenses 3 and 3' and the synchronization optical systems that focus the synchronization-detecting light of the synchronization detecting units 4 and 4' into light-receiving units to have power to correct the surface-tilt of the optical deflector 2 in the sub-scanning direction.

Further, in the optical scanning apparatus according to the present embodiment, it is preferable to keep the inter-surface deviation in the reflecting-surface-tilt of the optical deflector to 200 seconds or less to minimize the position shift in the sub-scanning direction when the synchronization-detecting light reaches the light-receiving unit and stabilize determination of write timing. In other words, the write position shift for each surface of the optical deflector is minimized in the optical scanning apparatus according to the present embodiment.

In the present embodiment, two scanning optical systems are arranged substantially symmetrically with respect to the sub-scanning cross-sectional surface (line 7 shown in FIG. 2) passing through rotational axis of the optical deflector 2. Consequently, the light beams are scanned in opposite directions on the scanning surfaces 6 and 6' located on either side of the rotating optical deflector 2. However, scanning is performed substantially linearly symmetrically on either side of the optical deflector 2.

In other words, scanning lens system components required on both sides for producing satisfactory beam spots on the scanning surfaces 6 and 6' have an identical geometry, reducing the manufacturing cost.

In the example shown in FIG. 2, the scanning lens system is represented by the f-theta lenses 3 and 3'. Other scanning lenses can equally be used in a substantially linearly symmetrical arrangement to configure the scanning lens system.

If L1, L2, and so on up to Lj (where j=1, 2, 3, . . . ) are scanning lenses forming the scanning lens system on one side of the optical deflector 2 in the sequence of the nearest to the farthest from the optical deflector 2, and L'1, L'2 and so on up to L'j (where j=1, 2, 3, . . . ) are scanning lenses on the other side of the optical deflector in the sequence of the nearest to the farthest from the optical deflector 2, the geometry of the lens at any position on either side of the optical deflector 2, such as the lenses Lj and L'j, are identical. This minimizes the cost of manufacturing.

In other words, the number of lenses, and the number of processes for manufacturing the optical scanning apparatus is minimized.

In the optical writing apparatus which includes a plurality of optical scanning apparatuses having the configuration described above, synchronization-detecting light from only one of the optical scanning apparatus can be detected, and the write timings of the other optical scanning apparatus can be electrically estimated based on the detected synchronization-detecting light signal.

There is enhanced reliability of synchronization detection in the optical scanning apparatus according to the present invention because of the stability of the synchronization-detecting light against the main scanning direction position shift. This enables the write timings of all the optical scanning apparatuses to be determined fairly accurately even if they are electrically estimated based on the synchronization-detection light signal of one of the optical scanning apparatus.

By this method (hereinafter, "delay method"), the number of light-receiving elements (synchronization detecting units) can be reduced, cutting down the cost of the writing optical system.

Embodiment 1-3 is described below with reference to FIG. 8.

In this embodiment, an optical writing apparatus 10 includes a plurality of optical scanning apparatuses arranged at two different levels, an upper level and a lower level.

The reference numeral 5 denotes a folded mirror and the reference numeral 6 denotes the scanning surface in the form of a photosensitive drum.

The rotational axis of the optical deflector 2 is common to both the levels. Consequently, use of just a single optical deflector 2, which is relatively expensive to manufacture, enables the cost of the optical writing apparatus 10 to be kept down.

Further, as the phases of the optical deflector 2 rotate around a common axis at both the levels, write timing can be estimated more accruing when synchronization detection is performed using the delay method.

Figure 8:
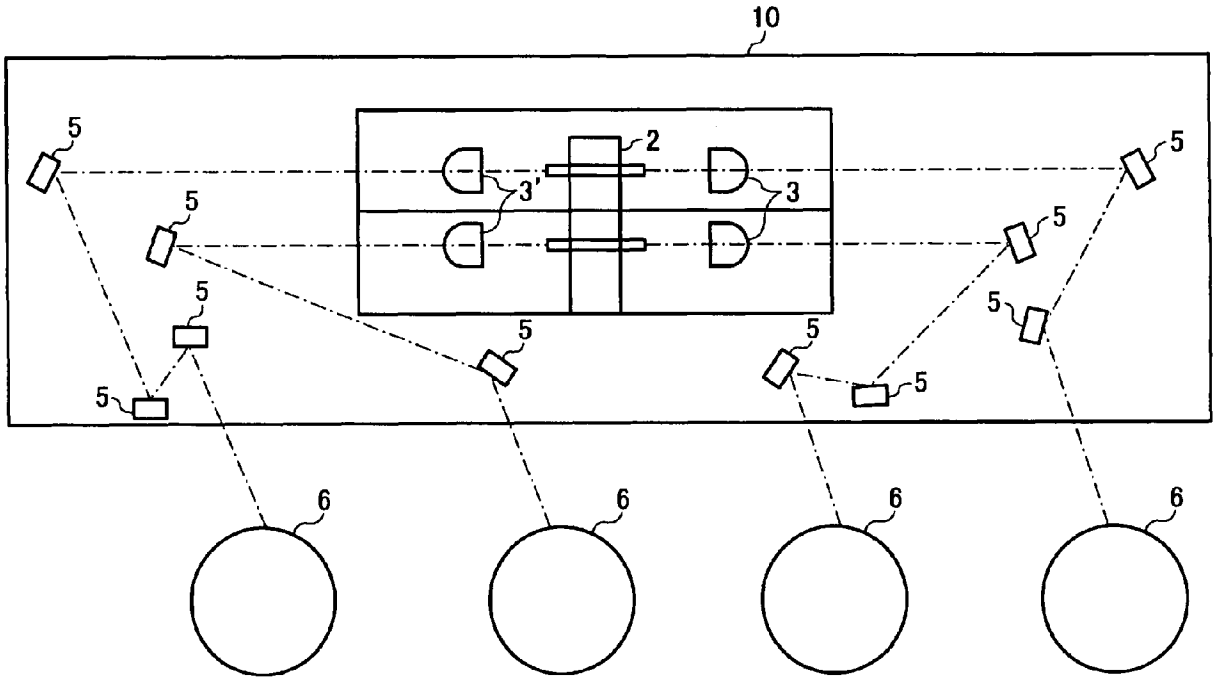
FIG. 8 is a side view of an optical writing apparatus wherein optical scanning apparatuses are arranged at two levels.
Figure 9:
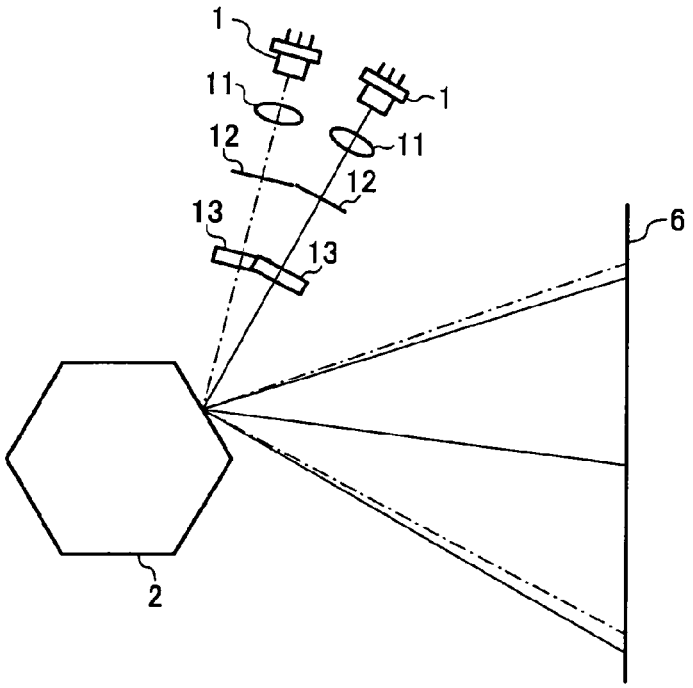
FIG. 9 is a schematic wherein incidence angles of light beams of an upper level and a lower level in a main scanning direction are different.

The optical writing apparatus 10 shown in FIG. 8 can be configured in such a way that the light beams from the upper level and the lower level are incident on the optical deflector 2 at different incidence angles (that is, the light beams are caused to form an intersection angle), as shown in FIG. 9.

In FIG. 9, the reference numeral H denotes a coupling lens, the reference numeral 12 denotes an aperture, and the reference numeral 13 denotes a cylindrical lens.

Thus, the space between the two levels of the optical scanning apparatus can be reduced up to the extent of the gap between the light sources of the upper level and the lower level, achieving compactness.

The formation of an intersection angle between the light beams from the light sources of the upper and lower levels can produce difference in the optical characteristics of the light beams and cause the optical deflector 2 to deflect the light beams at different angles. In particular, one of the synchronization-detecting light beams near the deflection angle tends to get eclipsed.

Figure 10:
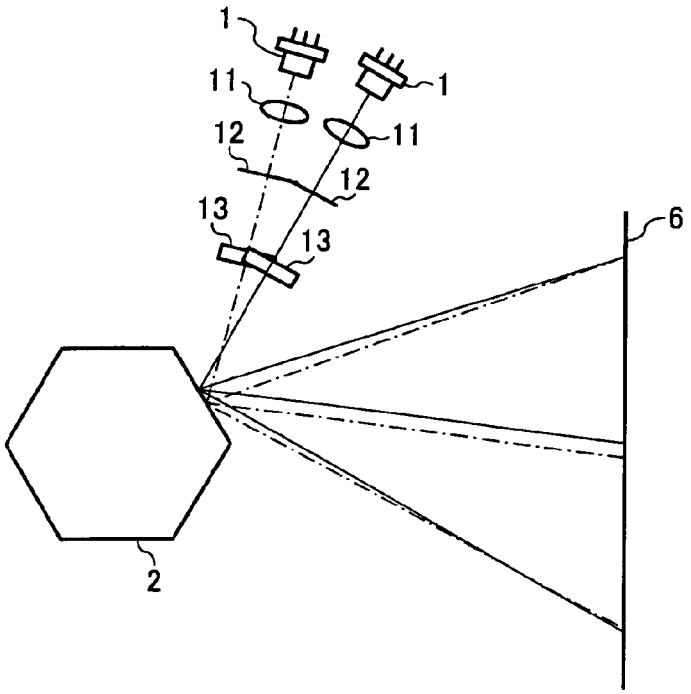
FIG. 10 is a schematic wherein reflecting point of the light beams of the upper level and the level are different.

This eclipsing of the light beam can be reduced by slightly adjusting the incidence point (by compensation of the difference in the maximum write widths of the upper level and lower level), as shown in FIG. 10, preventing the difference in the optical characteristics of the light beams of the scanning optical systems at the two levels.

The optical writing apparatus according to the preceding embodiments, the light beam incident on a deflective reflection surface of the optical deflector 2 is parallel to the normal dropped from the deflective reflection surface. The present invention can equally be applied to an optical writing apparatus in which the light beam incident on the deflective reflection surface of the optical deflector 2 can form an angle with the normal dropped from the deflective reflection surface (Embodiment 1-6). This method is called the grazing-incidence method.

Figure 11A:
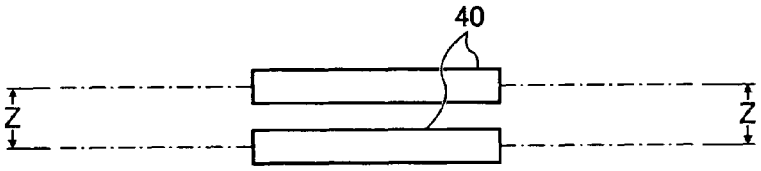
FIG. 11A is a schematic of the conventional horizontal incidence method.

In the existing optical scanning apparatuses that use a horizontal opposing scanning method, as shown in FIG. 11A, polygon mirrors 40 are required to be provided at two levels to obtain a distance Z required for separating the light beams directed towards different scanning surfaces. It is also possible to align the polygon mirrors 40 at a single level. However, this will increase the thickness of the polygon mirror portion, adversely affecting the performance speed and the cost.

Figure 11B:
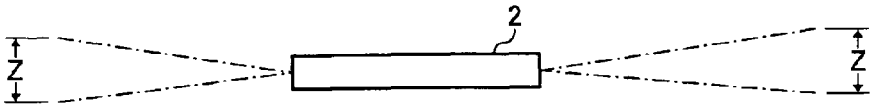
FIG. 11B is a schematic of a grazing-incidence method.

In the grazing-incidence optical systems used in the present invention, as shown in FIG. 11B, a pair of light beams from a plurality of light sources that form different angles in the sub-scanning direction with respect to the normal are made incident on two opposing deflective reflection surfaces of the same optical deflector 2. Consequently, by limiting provision of the optical deflector 2 to just one level and further by reducing the thickness of the polygon mirror portion in the sub-scanning direction, the rotational inertia of the optical deflector 2 can be reduced, shortening the startup time.

The advantage of the grazing-incidence method is that the manufacturing cost of the optical writing apparatus can be kept down as providing the optical deflector 2 at one level enables forming of a full-color image.

To implement the grazing-incidence method, the surface of the scanning lenses needs to be modified appropriately as, otherwise the scan line tends to bend and wavefront aberration occurs. However, the effects can be put to practical use when assembling, cutting down the cost.

Embodiment 1-7 (full color image forming apparatus) is described below with reference to FIG. 12.

In a full color image forming apparatus according to the present embodiment, such as a laser color printer, photosensitive drums 20Y (yellow), 20M (magenta), 20C (cyan), and 20K (black) are arranged serially pressed against an intermediate transfer belt 21, which stretched tightly over rollers 102a, 102b, and 102c.

Arranged around the photosensitive drum 20Y in counterclockwise direction are a not shown charging unit, an optical scanning apparatus 105 that functions as an exposing unit common to all the photosensitive drums, a developing unit 106Y, a not shown primary transfer roller provided on the underside of the intermediate transfer belt 21, a not shown cleaning unit, a not shown neutralizing unit, etc. Identical components are arranged around each of the photosensitive drums 20M, 20C, and 20K.

An electrostatic latent image is formed on each of the photosensitive drums 20Y, 20M, 20C, and 20K by light beams L1, L2, L3, and L4, respectively, based on each color image data. The latent images on the photosensitive drums 20Y, 20M, 20C, and 20K are converted to visible images by the respective developing units 106Y, 106M, 106C, and 106K.

A toner image of each color is superposed sequentially on the intermediate transfer belt 21 and transferred. A secondary transfer roller 102d batch-transfers the superposed image onto a transfer sheet (recording medium) supplied at a predetermined timing from a sheet feeder 111. A not shown cleaning unit cleans the intermediate transfer belt 21 after the transfer of the superposed image to the transfer sheet. The transfer sheet is conveyed to a fixing device 114, which fixes the color image by application of heat and pressure.

The transfer sheet, after being passed through the fixing device 114, is transported substantially vertically in the main body of the apparatus to be ejected into a discharge tray 110 located at the uppermost portion of the apparatus.

Excellent reproduction of images can be realized by using the optical scanning apparatus according to the first embodiment as the optical scanning apparatus 105.

Various materials such as silver salt film can be used as photosensitive image-bearing member. The latent image is formed by optical scanning and is converted into a visual image by the normal silver salt photographic process. Such image forming devices can be implemented as optical photoengraving devices or optical imaging devices that produce CT scan images, etc.

Another photosensitive image-bearing member could be a full color medium in the form of a full color printing paper, which directly produces a visible color image by the heat energy of the beam spot produced by optical scanning.

Alternatively, a photoconductive photosensitive member such as a zinc oxide sheet can be used as a photosensitive image-bearing member. Another option is a reusable selenium photosensitive member or organic semiconductor member in drum or belt form.

When a photoconductive photosensitive member is used as the image-bearing member, an electrostatic latent image is formed by the uniform charging of the photosensitive member and optical scanning by the optical scanning apparatus. The electrostatic latent image is converted to a visible toner image by developing. Fixing of the toner image takes place directly in the case where the photosensitive member is a zinc oxide sheet. If the photosensitive member is of the reusable type, the toner image is first transferred to a recording medium in sheet form such as a transfer sheet or an overhead projector (OHP) sheet (plastic sheet for overhead projector), before the image is fixed.

The toner image may either be directly transferred from the photosensitive member onto the recording medium (direct transfer method) or first may be transferred onto an intermediate transfer medium and therefrom to the recording medium (intermediate transfer method).

Such image forming devices can be implemented as optical printers or plotters, digital copiers, etc.

The optical scanning apparatus according to the present invention achieves the effect of reduced color shift by virtue of being configured by combining a linearly symmetrical arrangement of the scanning optical systems and a condition, which does not allow the synchronization-detecting light beams to be affected by temperature variation.

The scanning optical systems for each color would need as far as possible to be made close to each in terms of their form to realize an optical scanning apparatus that performs well in spite of temperature variation. In other words, even if main scanning position shift occurs for each color, the color shift will not be discernible, as all the colors would show the same magnitude of main scanning position shift.

The main scanning position shift caused by temperature variation is explained below in detail. In the scanning optical system, the light beams deflected by the optical deflector are refracted/condensed by the scanning lenses and scan the sub-scanning surface at a constant speed. When the scanning speed is ideal, a proportional relation is established between a rotation angle θ of the optical deflection and the beam spot position on the sub-scanning surface.

In other words, ideal beam spot position (hereinafter, "ideal image height") is determined by the angle of the deflective reflection surface of the optical deflector 2. A shift from the ideal image height caused due to any factor is defined as the main scanning position shift. From this it can be easily imagined that the main scanning position shift can become so large that the optical line passing through the scanning lenses recedes far from the optical axis.

The rotation axis of the optical deflector 2 is different from the position of the deflective reflection surface an asymmetrical scanning with respect to the optical axis of the scanning lenses takes place. Consequently, the main scanning position shift of the image height on the either side of the optical deflector 2 will be different, yielding an asymmetrical form shown in FIG. 1 when the main scanning position shift is plotted in terms of image height h.

The following methods can be used for preventing only the synchronization-detecting light beams from being affected by temperature variation. The effects due to the present invention can be garnered if an appropriate method is selected in accordance with the scanning optical system.

(1) Designing a synchronization optical system such that the synchronization-detecting light does not pass through the scanning lenses at all.

(2) Providing an air layer (an opening) in the synchronization-detecting-light passage portion in the scanning lens to prevent refraction by the scanning lens.

(3) Configuring the synchronization-detecting-light passage portion such that it is in the form a horizontal plate in the main scanning direction so that even if deformation occurs in the scanning lens, the synchronization-detecting light is not affected.

Method (1) is most effective for stabilization of the synchronization-detecting light. However, achieving compactness and slimness of the optical scanning apparatus necessitates having to place the beam-shaping optical systems, the synchronization-detecting-light passage portion, and the scanning lens very close to the optical deflector, which is not desirable. Thus, there is a constraint on the quest for an ever more compact and slim optical scanning apparatus by way of the closest the various optical components can be placed to the optical deflector.

The problem faced in Method (1) can be avoided by implementation of Methods (2) and (3). However, in these methods, the scanning lens has to be subjected to a secondary processing, increasing the cost.

The synchronization-detecting light passes through the no-power portion of the scanning lens in all the three Methods (1) to (3).

When applying the optical scanning apparatus according to the present invention to a multi-beam method, all the components from line imaging optical system to the scanning optical system can be made common to a plurality of light beams that are coupled. This enables the optical scanning apparatus to be configured from line imaging optical system onwards as if for a single-beam method. Consequently, a multi-beam optical scanning apparatus can be realized that is stable against mechanical variations.

As compared to the single beam method, the same writing speed can be realized by fewer turns of the optical deflector in the multi-beam method. Thus, less power is consumed for driving the optical deflector, resulting in energy saving.

The light source used in the multi-beam method can use a laser diode (LD) array method or a beam compositing method. If a gap of 10 μm or more is kept between the light-emitting units in the LD array light source, adverse thermal and electrical effect of adjacent light-emitting units can be effectively prevented, and an ideal multi-beam optical scanning can be performed.

In the grazing-incidence method, the optical scanning apparatus has the optical deflectors on just a single level. In other words, by using the grazing-incidence method, the height of the deflecting unit (polygon mirror) (the height in the sub-scanning direction) can be reduced, and as the surface area in contact with the atmosphere is small, increase in power consumption due to windage loss can be prevented, resulting in less power consumption by the optical writing apparatus.

Figure 13:
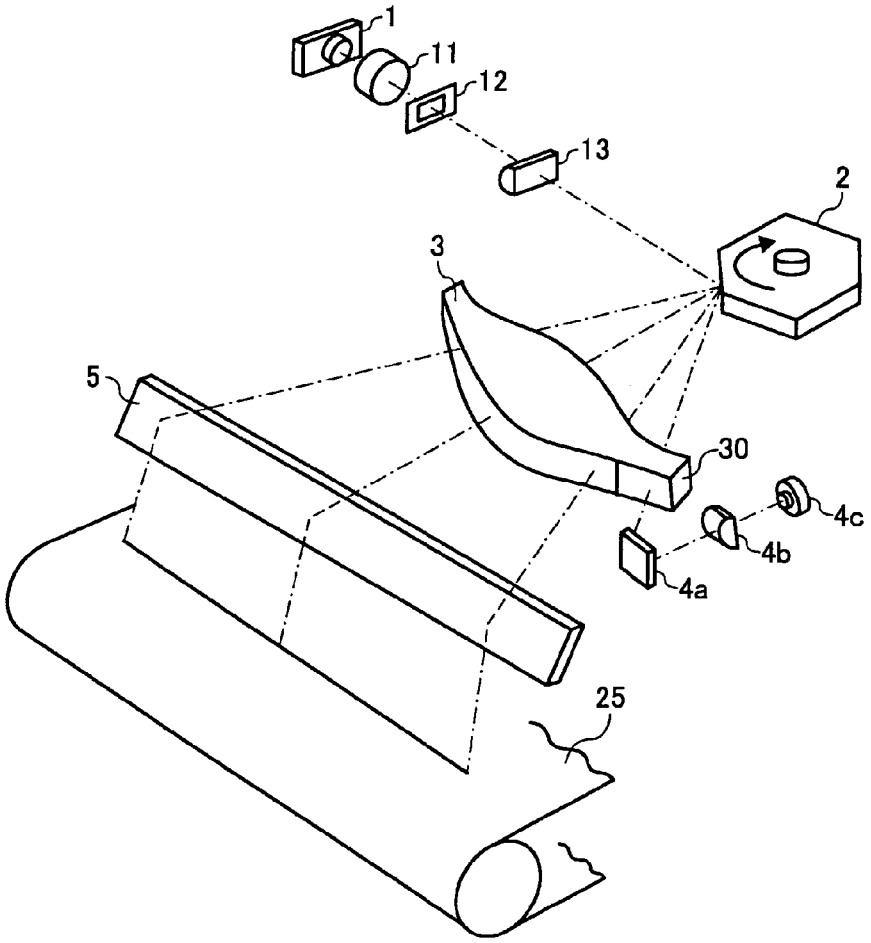
FIG. 13 is an oblique view of the principal parts of an optical scanning apparatus according to embodiment 2-1.

FIG. 13 is a schematic of the principal parts of the optical scanning apparatus according to a second embodiment of the present invention. The optical scanning apparatus according to the second embodiment employs the single beam method. A light source 1 in the form of a semiconductor laser device emits a light beam, which is dispersive, and which enters the coupling lens 11 and is coupled into the optical system disposed subsequent to the coupling lens.

The light beam emerging from the coupling lens 11 is weakly dispersive, and passes through the 12, undergoes beam shaping where the aperture 12 permits only the central portion of the light beam to pass through, cutting off the peripheral portion of the light beam. The light beam exiting the aperture 12 enters the cylindrical lens 13, which is a linear imaging optical system. The cylindrical lens 13, which has no power in the main scanning direction and a positive power in the sub-scanning direction, converges the light beam entering it in the form of a linear image, which is oblong in the main scanning direction in the vicinity of a deflective reflection surface of the optical deflector 2. The optical deflector 2 functions as an optical deflector.

The deflective reflection surfaces of the optical deflector 2, which is spinning at a constant speed, deflect the light beam equiangularly and at uniform speed. The light beam thus deflected by the optical deflector 2 passes through a single f-theta lens 3, which forms a scanning optical system. The optical path of the light beam exiting the f-theta lens 3 is bent by a folded mirror 5 and the light beam is focused as a beam spot on a photoconductive photosensitive member 25, which is the scanning surface. In this way, the photoconductive photosensitive member 25, that is, the scanning surface, is optically scanned.

Prior to optically scanning the photoconductive photosensitive member 25 of sheet-type, the deflected light beam passes through the no-power portion of the f-theta lens 3, is reflected by a synchronization mirror 4a, which functions as a converging unit, and is again converged in the main scanning direction by a synchronization lens 4b, which functions as a converging unit, into a synchronization detecting unit 4c. The write start timing is determined based on the output from the synchronization detecting unit 4c. The synchronization mirror 4a and the synchronization lens 4b together form the synchronization optical system.

The term scanning optical system refers to an optical system that converges the light beam deflected by the optical deflector 2 functioning as a beam deflector, as a beam spot on the scanning surface. In the present embodiment, the scanning optical system includes a single f-theta lens 3.

The term "spot diameter of beam spot" used in the specification is defined by an intensity $1/e^2$ of a line spread function of the light intensity distribution in the beam spot on the scanning surface.

If the light intensity distribution, f(Y,Z) to be determined from a main scanning direction coordinate Y and a sub-scanning direction coordinate Z, taking the central coordinates of the beam spot formed on the scanning surface as the reference, the line spread function in Z direction LSZ is defined by, $LSZ(Z)=\int f(Y,Z)dY$ (The integration of the entire width of the beam spot in Y direction is performed).

The line spread function in Y direction LSY is defined by, $LSY(Y)=\int f(Y,Z)dZ$ (The integration of the entire width of the beam spot in Z direction is performed).

The line spread functions LSZ(Z) and LSY(Y) have substantially Gauss distribution shape. The spot diameters in Y direction and Z direction in that area are considered where the line spread functions LSZ(Z) and LSY(Y) have a maximum value of $1/e^2$ or greater.

The spot diameter defined by the line spread functions can be easily measured by optically scanning at a uniform speed the beam spot along a slit and integrating the amount of light received by a light detector that receives the light that comes out of the slit. Apparatuses for measuring the spot diameter are available in the market.

In the second embodiment, the optical surface (converging unit) that contributes the most towards a sub-scanning position shift in the synchronization detecting unit 4c is the synchronization mirror 4a.

Accordingly, in the second embodiment, the power of the synchronization lens 4b in the sub-scanning direction is such that the synchronization mirror 4a and the synchronization detecting unit 4c are coupled within the sub-scanning cross-section, and in the main scanning direction is such that the synchronization lens 4b can converge the light beam into the synchronization detecting unit 4c.

Thus, the state of convergence of the light beam within the sub-scanning cross-section of the synchronization detecting unit 4c is determined based on the positional relation between the optical elements (converging units) of the synchronization optical system.

Figure 14:
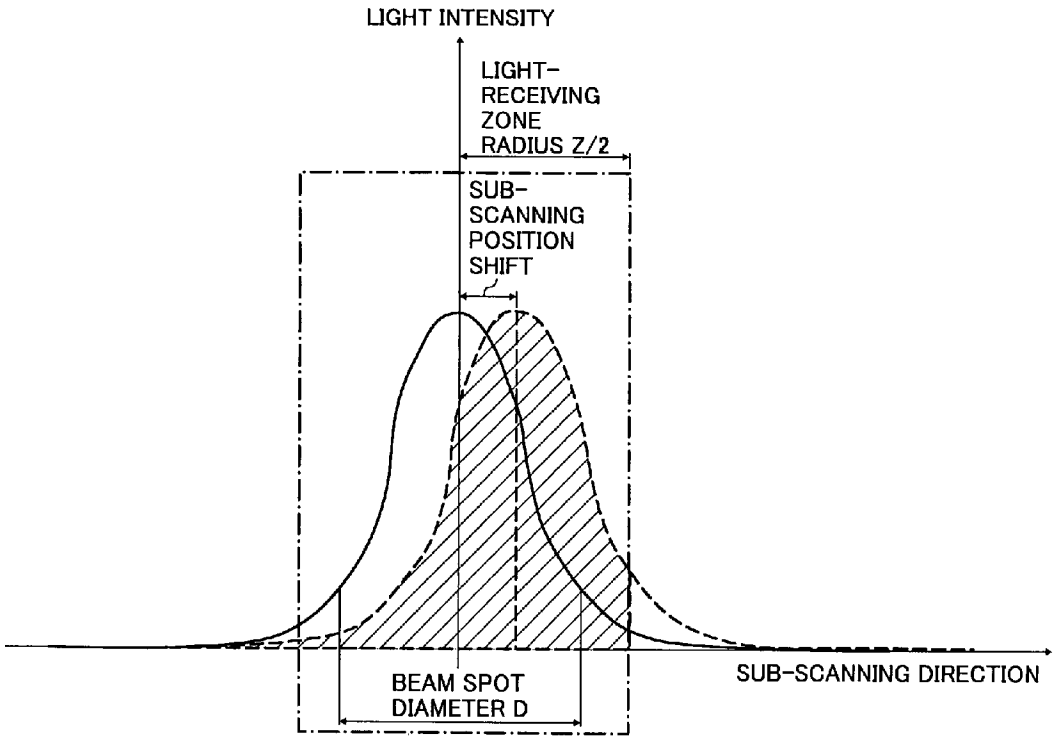
FIG. 14 is a graph showing a relation between a sub-scanning position shift of synchronization-detecting light incident on a synchronization detecting unit and a diameter of a beam spot.

In the second embodiment, if the power of the synchronization lens 4b is set so as to satisfy a condition:

$$D>Z/2 \quad (1)$$

where D is the beam diameter at the light-receiving unit of the synchronization detecting unit 4c, and Z is the light-receiving zone of the light-receiving unit in the sub-scanning direction, the synchronization light intensity in the light-receiving zone of the synchronization detecting unit 4c will resemble the Gaussian distribution shown by the solid line in FIG. 14.

A major part of the sub-scanning position shift due to error in the optical elements in the scanning optical system gets cancelled out due to the coupling relation of the synchronization mirror 4a and the synchronization detecting unit 4c. However, an insignificant amount of sub-scanning position shift occurs due to error of the optical elements that are not included in the coupling relation.

As a result, the Gaussian distribution shifts in the sub-scanning direction as shown by the dashed line with the light intensity distribution restricted to the hatched portion in FIG. 14. If the condition in Non-equality (1) is satisfied, the beam spot diameter in the sub-scanning direction is large enough to cover the light-receiving zone. Thus, even if there is a residual sub-scanning position shift, not much of the light received is lost.

The beam spot position shift occurring in the synchronization detecting unit is described below. Synchronization detection is performed when a light beam scanned in the main scanning direction passes through a photodiode (synchronization detecting unit). Therefore, the synchronization optical system in general converges the light beam into the synchronization detecting unit within the main scanning cross-section.

As the timing of light emission from the light source can be electrically determined based on the light reception timing, even if there is a main scanning position shift, synchronization detection is not affected.

However, in case of detection of a sub-scanning position shift, either the synchronization-detecting light does not enter the synchronization detecting unit or, even if the synchronization-detecting light does enter the synchronization detecting unit, the amount of light is not adequate enough for the synchronization detecting unit to convert into electrical signals. Failure of synchronization detection leads to faulty determination of light emission timing, resulting in poor optical writing.

The increasing demand for more and more compact scanning optical system necessitates increasing the length of the optical path the synchronization optical system. However, increasing the length of the optical path has the effect of amplifying the position shift due to the optical surfaces in the optical system, and the tilt of the optical surface and the sub-scanning position shift in such a case is too significant to be ignored.

Therefore, in the second embodiment, the optical surface that contributes largely to sub-scanning position shift is selected to be coupled with the synchronization detecting unit within the sub-scanning cross-section to realize an optical system, that includes all the components from the light source to the synchronization detecting unit, that causes minimum sub-scanning position shift.

However, the coupling relation mainly relaxes the angle shift of the synchronization-detecting light incident on the synchronization detecting unit within the sub-scanning cross-section and does not improve the shift of the synchronization-detecting light in the sub-scanning direction. Therefore, if there is error in the entire optical surface, residual sub-scanning position shift will definitely occur.

In such a case, it would be preferable that in addition to the coupling relation, the following condition be satisfied:

$$D>Z/2 \quad (1)$$

where D is the beam spot diameter at the light-receiving unit of the synchronization detecting unit of the synchronization optical system, and Z is the light-receiving zone of the light-receiving unit in the sub-scanning direction.

If the diameter of the beam spot in the sub-scanning direction is greater than the radius of the light-receiving zone Z/2, adequate amount of light becomes incident on the photo diode, irrespective of the position shift.

Thus, due to the synergetic effect of the coupling relation and an adequately large beam spot diameter in the sub-scanning direction, an image forming apparatus in which synchronization optical system is used is sturdier against external shocks during the shipping process, even if minor variations in mass production are taken into account.

The optical system formed from the synchronization optical system and the synchronization detecting unit 4c, which form a coupling relation, should preferably be a reducing system within the sub-scanning cross-section. In the form of a reducing system, the synchronization optical system reduces the error before the converging unit and before being incident on the synchronization detecting unit 4c, thus more strongly preventing a sub-scanning position shift.

The synchronization optical system can include the synchronization mirror 4a to guide the light beam into the synchronization detecting unit 4c. As the synchronization mirror 4a contributes greatly to the sub-scanning position shift, the contribution can be reduced by coupling the synchronization mirror 4a and the synchronization detecting unit 4c. Further, effect of reduced sub-scanning position shift can be further improved by enabling the optical system formed by the synchronization optical system and the synchronization detecting unit 4c to function as a reducing system.

The f-theta lens 3 of the scanning optical system that includes the synchronization optical system can include a no-power portion 30 in the main scanning direction. The synchronization-detecting light passing through the no-power portion 30 is not affected by deformation of the f-theta lens due to temperature variation and maintains an unvarying main scanning position.

The surface tilt of the optical deflector 2 also contributes largely to sub-scanning position shift of the synchronization detecting unit 4c. Therefore, in the optical scanning apparatus according to the present embodiment, the inter-surface deviation of the reflecting-surface-tilt of the optical deflector 2 is limited to 200 seconds or less to further reduce the sub-scanning position shift when the synchronization-detecting light reaches the light-receiving unit and to stabilize the determination of the write timing.

However, the cost involved in realizing high precision in inter-surface deviation is very high. In addition, there are physical constraints. Therefore, it is preferable for the no-power portion 30 to have power so as to optically correct the surface tilt of the optical deflector 2 in the sub-scanning direction.

If the synchronization optical system does not include the synchronization mirror 4a, the adverse effect of the surface tilt of the optical deflector 2 can be reduced by coupling the reflecting point of the optical deflector 2 and the synchronization detecting unit 4c using the no-power portion 30 and the synchronization lens 4b.

However, if the synchronization optical system includes the synchronization mirror 4a, the adverse effect of the surface tilt of the optical deflector 2 and the synchronization mirror 4a can be reduced by coupling the reflecting point of the optical deflector 2 and the synchronization detecting unit 4c as well as reflecting point of the synchronization mirror 4a and the synchronization detecting unit 4c.

It is preferable to use an optical scanning apparatus that includes an assembly of a plurality of scanning optical systems (optical scanning apparatuses). The assembly of the scanning optical systems can be in the form of a common optical deflector 2 and a plurality of scanning optical systems arranged facing each other on either side of the optical deflector 2 (opposing scanning method).

A synchronization detecting unit common to all the scanning optical systems can detect the synchronization-detecting light of the plurality of scanning optical systems of the optical scanning apparatus.

By using just a single synchronization detecting unit, the cost can be kept down, as photodiodes are generally very expensive. Corresponding to the reduced number of photodiode, the number of substrate also can be reduced, increasing the flexibility of layout and enabling realization of a compact optical scanning apparatus.

The write timings of the scanning optical systems whose light beams are not guided into the only synchronization detecting unit are electrically estimated based on the detected synchronization-detecting light signal.

Adoption of this method of electrically detecting the write timings of the scanning optical systems, called the delay method, enables cost reduction and realization of a compact writing optical system as the number of photodiodes is reduced.

The image forming apparatus according to embodiment 2-2 is described below with reference to FIG. 15.

An image forming apparatus 1000 according to the present embodiment, such as a laser printer, includes a cylindrical drum-type photosensitive image-bearing member 1110. Around the image-bearing member 1110 are arranged a charging roller 1121, a developing device 1131, a transfer roller 1141, and a cleaning device 1151. A corona charger is used as a charging unit.

An optical scanning apparatus 1171 that performs optical scanning by a laser beam LB carries out exposure for optical writing between the charging roller 1121 and the developing device 1131.

Figure 15:
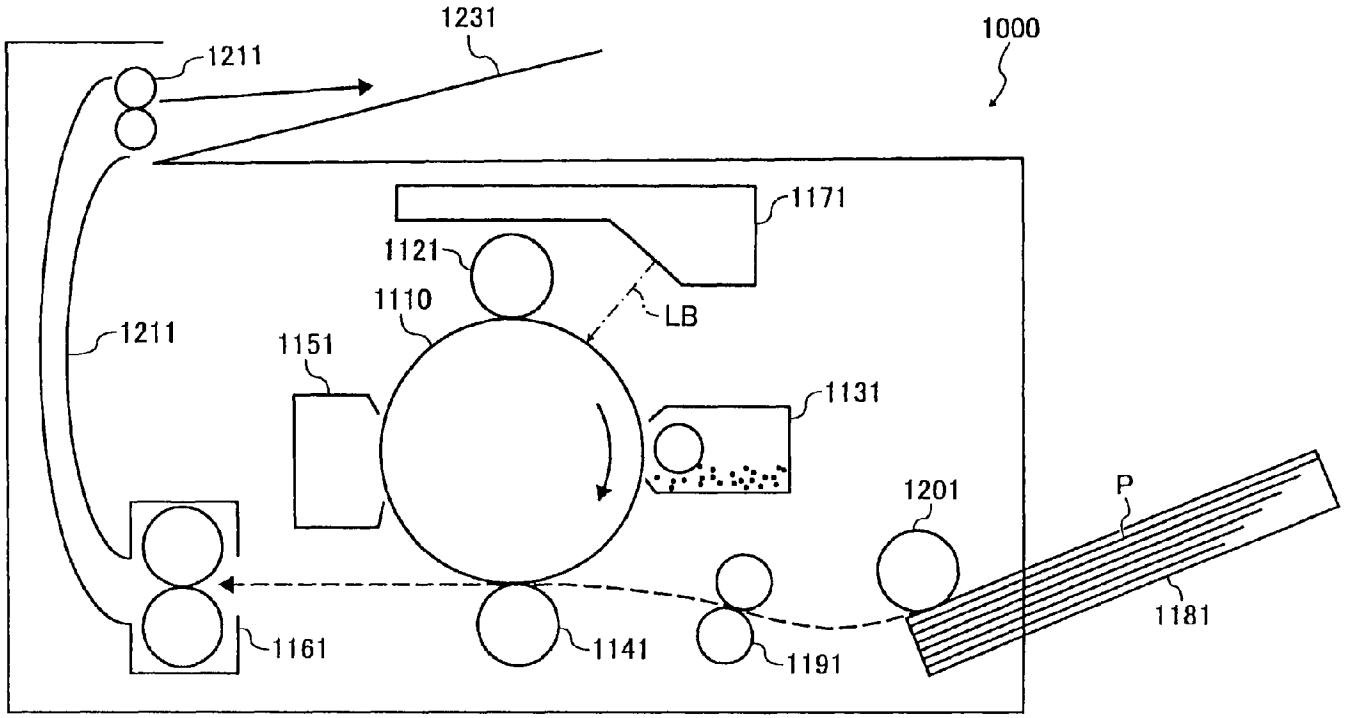
FIG. 15 is a schematic of a single-color image forming apparatus.

In FIG. 15, the reference numeral 1161 denotes a fixing device, the reference numeral 1181 denotes a cassette, the reference numeral 1191 denotes a pair of resist rollers, the reference numeral 1201 denotes a feed roller, the reference numeral 1211 denotes a conveyance route, the reference numeral 1221 denotes a pair of ejection rollers, the reference numeral 1231 denotes a tray, and the reference symbol P denotes a sheet-type recording medium in the form of a transfer sheet.

When performing image formation, the image-bearing member 1110 turns clockwise at a constant speed. The charging roller 1121 uniformly charges the surface of the image-bearing member 1110. The laser beam LB of the optical scanning apparatus 1171 exposes surface of the image-bearing member 1110 to form thereon an electrostatic latent image. The latent image is a negative latent image and the image portion is exposed.

The developing device 1131 performs a reversal development on the latent image and forms a visible toner image on the image-bearing member 1110. The cassette 1181 containing the transfer sheet P is removably engaged into the main frame of the image forming apparatus 1000. When the cassette 1181 is in an engaged state, the feed roller 1201 feeds the leading edge of the topmost transfer sheet P between the pair of resist rollers 1191. The resist rollers 1191 passes the transfer sheet along to a transfer region of the image-bearing member 1110, timing it so that the transfer sheet reaches the transfer region when the toner image on the image-bearing member 1110 reaches a transfer position.

At the transfer region, the transfer roller 1141 performs an electrostatic transfer to transfer the toner image from the image-bearing member 1110 onto the transfer sheet P. The transfer sheet P carrying the toner image thereon is conveyed to the fixing device 1161, which fixes the toner image. The transfer sheet P is then conveyed through the conveyance route 1211 and ejected out on to the tray 1231 by the pair of ejection rollers 1221.

After the transfer of the toner image to the transfer sheet P, the cleaning device 1151 cleans the surface of the image-bearing member 1110 to remove residual toner or paper particles.

Excellent image forming can be realized if the optical scanning apparatus according to the first embodiment is used as the optical scanning apparatus 1171.

Figure 12:
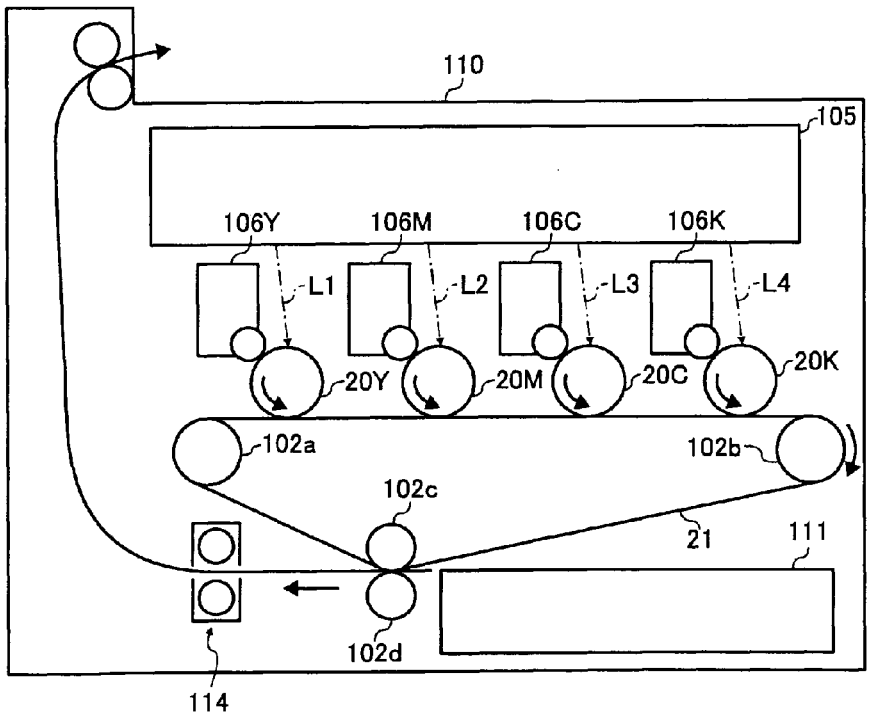
FIG. 12 is a schematic of a full-color image forming apparatus.

The second embodiment can be expanded to a full color image forming apparatus such as the one shown in FIG. 12.

In other words, excellent image forming can be realized by using the optical scanning apparatus 1171 of embodiment 2-1 in place of the optical scanning apparatus 105.

According to an aspect of the present invention, color shift can be reduced by combining a linearly symmetrical arrangement of scanning optical systems and a condition in which synchronization-detecting light is not affected by temperature variation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising:

2n (where n≥1) light sources[, each light source including m (where m≥1) light emitting units];

a *plurality of* synchronization detecting [unit] *units* that [receives m×n] *receive* light beams from the light sources[, scans a scanning surface by the light beams emitted by 2n light sources, and determines a write timing for writing to the scanning surface, the light beams being substantially symmetrical with respect to a sub-scanning cross-section that includes a rotational axis of an optical deflector];

*an optical deflector that deflects the light beams from the light sources; and* a first scanning lens system and a second scanning lens system [arranged on either side of the optical deflector and causing m] *that cause the* light beams to perform imaging on [the] respective [scanning surfaces] *photosensitive members, the first scanning lens system including at least a first scanning lens and the second scanning lens system including at least a second scanning lens,* wherein

[synchronization detection by] the *plurality of* synchronization detecting [unit is performed at one end of each scan line] *units are configured to perform synchronization detection*, [and]

the first scanning lens *is a scanning lens that the light beams deflected by the deflector first enter in the first scanning lens* system and the second scanning lens [system] *is a scanning lens that the light beams deflected by the deflector first enter in the second scanning lens system, the first scanning lens and the second scanning lens* are arranged substantially symmetrically with reference to a line [in a main scanning direction orthogonal to the] *that passes through a* rotational axis of the optical deflector *and is substantially parallel to a longitudinal direction of the first and second scanning lenses*, and the *first and second* scanning lens [system] *systems* [includes] *include* a no-power portion in the main scanning direction, and the light beams guided to the *plurality of* synchronization detecting [unit] *units* pass through the no-power portion.

2. The optical scanning apparatus according to claim 1, wherein a magnitude of a spot position shift of [the] synchronization-detecting light in the main scanning direction on an imaging surface or its equivalent due to temperature variation detected by the *plurality of* synchronization detecting [unit] *units* is 5 μm/° C. or less.

3. The optical scanning apparatus according to claim 1, wherein an inter-surface deviation of a surface tilt of the optical deflector is kept to 200 seconds or less.

4. The optical scanning apparatus according to claim 1, wherein [a] synchronization optical [system] *systems* of the *plurality of* synchronization detecting [unit] *units* that [converges the] *converge* synchronization-detecting light into [a] light-receiving [unit corrects] *units correct* the effect of a surface tilt of the optical deflector.

5. The optical scanning apparatus according to claim 1, wherein from among a first set of scanning lenses L1, L2, and so on up to q (where j=1, 2, 3 . . . ) forming the first scanning lens system in the sequence of the nearest to the farthest from the optical deflector on one side of the optical deflector and a second set of scanning lenses L'1, L'2, and so on up to Lj (where j=1, 2, 3, . . . ), any pair of scanning lenses Lj and Lj have an identical geometry.

6. An image forming apparatus comprising*:*

*an exposing unit;*

*a developing unit;*

*a transfer unit;*

*a fixing unit; and* the optical scanning apparatus according to claim 1.

7. The optical scanning apparatus according to claim 1, wherein the first scanning lens system and the second scanning lens system are arranged facing each other on either side of the optical deflector.

8. An optical scanning apparatus, comprising:

2n (where n≥1) light sources[, each light source including m (where m≥1) light emitting units];

a *plurality of* synchronization detecting [unit] *units* that [receives m×n] *receive* light beams from the light sources[, scans a scanning surface by the light beams emitted by 2n light sources, and determines a write timing for writing to the scanning surface, the light beams being substantially symmetrical with respect to a sub-scanning cross-section that includes a rotational axis of an optical deflector]; [and]

*an optical deflector that deflects the light beams from the light sources; and* a first scanning lens system and a second scanning lens system [arranged on either side of the optical deflector and causing m] *that cause the* light beams to perform imaging on [the] respective [scanning surfaces] *photosensitive members, the first scanning lens system including at least a first scanning lens and the second scanning lens system including at least a second scanning lens,* wherein

[synchronization detection by] the *plurality of* synchronization detecting [unit is performed at one end of each scan line] *units are configured to perform synchronization detection*, the first scanning lens [system] *is a scanning lens that the light beams deflected by the deflector first enter in the first scanning lens system* and the second scanning lens [system] *is a scanning lens that the light beams deflected by the deflector first enter in the second scanning lens system, the first scanning lens and the*

*second scanning lens* are arranged substantially symmetrically with reference to a line [in a main scanning direction orthogonal to the] *that passes through a* rotational axis of the optical deflector *and is substantially parallel to a longitudinal direction of the first and second scanning lenses*, and the [synchronization-detecting] *synchronization detecting units are configured to receive the* light [does] *beams such that the light beams do* not pass through the [scanning lens system] *first and second scanning lenses*.

9. The optical scanning apparatus according to claim 8, wherein the first scanning lens system and the second scanning lens system are arranged facing each other on either side of the optical deflector.

10. An optical scanning apparatus, comprising:

2n (where n≥1) light sources[, each light source including m (where m≥1) light emitting units];

a *plurality of* synchronization detecting [unit] *units* that [receives m×n] *receive* light beams from the light sources[, scans a scanning surface by the light beams emitted by 2n light sources, and determines a write timing for writing to the scanning surface, the light beams being substantially symmetrical with respect to a sub-scanning cross-section that includes a rotational axis of an optical deflector]; [and]

*an optical deflector that deflects the light beams from the light sources; and* a first scanning lens system and a second scanning lens system [arranged on either side of the optical deflector and causing m] *that cause the* light beams to perform imaging on [the] respective [scanning surfaces] *photosensitive members, the first scanning lens system including at least a first scanning lens and the second scanning lens system including at least a second scanning lens,* wherein

[synchronization detection by] the *plurality of* synchronization detecting [unit is performed at one end of each scan line] *units are configured to perform synchronization detection*, the first scanning lens *is a scanning lens that the light beams deflected by the deflector first enter in the first scanning lens* system and the second scanning lens [system] *is a scanning lens that the light beams deflected by the deflector first enter in the second scanning lens system, the first scanning lens and the second scanning lens* are arranged substantially symmetrically with reference to a line [in a main scanning direction orthogonal to the] *that passes through a* rotational axis of the optical deflector *and is substantially parallel to a longitudinal direction of the first and second scanning lenses*, and an opening is provided in *each of* the *first and second* scanning lens [system] *systems*, and [the synchronization-detecting] *synchronization detecting* light passes through the opening.

11. The optical scanning apparatus according to claim 10, wherein the first scanning lens system and the second scanning lens system are arranged facing each other on either side of the optical deflector.

12. An optical writing apparatus comprising:

a plurality of optical scanning apparatuses, each optical scanning apparatus including, 2n (where n≥1) light sources[, each light source including m (where m≥1) light emitting units];

a *plurality of* synchronization detecting [unit] *units* that [receives m×n] *receive* light beams from the light sources[, scans a scanning surface by the light beams emitted by 2n light sources, and determines a write timing for writing to the scanning surface, the light beams being substantially symmetrical with respect to a sub-scanning cross-section that includes a rotational axis of an optical deflector]; [and]

*an optical deflector that deflects the light beams from the light sources; and* a first scanning lens system and a second scanning lens system [arranged facing each other on either side of optical deflector and causing m] *that cause the* light beams to perform imaging on [the] respective [scanning surfaces] *photosensitive members, the first scanning lens system including at least a first scanning lens and the second scanning lens system including at least a second scanning lens,* wherein [synchronization detection by] the *plurality of* synchronization detecting [unit is performed at one end of each scan line] *units are configured to perform synchronization detection*, and the first scanning lens *is a scanning lens that the light beams deflected by the deflector first enter in the first scanning lens* system and the second scanning lens [system] *is a scanning lens that the light beams deflected by the deflector first enter in the second scanning lens system, the first scanning lens and the second scanning lens* are arranged substantially symmetrically with reference to a line [in a main scanning direction orthogonal to the] *that passes through a* rotational axis of the optical deflector *and is substantially parallel to a longitudinal direction of the first and second scanning lenses*, wherein [synchronization-detecting] *synchronization detecting* light of only one optical scanning apparatus is detected, and write timings of the other optical scanning apparatuses [is] *are* electrically estimated based on detection signals of detected [synchronization-detecting] *synchronization detecting* light.

13. The optical writing apparatus according to claim 12, wherein the optical deflectors of the optical scanning apparatuses have a common rotational axis.

14. The optical writing apparatus according to claim 12, wherein the light beams from the plurality of levels are incident on the same phase plane of the optical deflector at different incidence angles in the main scanning direction.

15. The optical writing apparatus according to claim 12, wherein [the] synchronization optical [system includes] *systems include* a synchronization mirror that guides the light beam towards the *plurality of* synchronization detecting [unit] *units*, and the synchronization [mirror] *mirrors* and the *plurality of* synchronization detecting [unit] *units* are coupled within the sub-scanning cross-section.

16. The optical writing apparatus according to claim 12, wherein the light beams from [the] *a* plurality of levels incident on [the] *a* same phase plane of the optical deflector are deflected in a main scanning direction by different reflecting points in the main scanning direction.

*17. An image forming apparatus comprising;*

*an exposing unit;*

*a developing unit;*

*a transfer unit;*

*a fixing unit; and*

*the optical scanning apparatus according to claim 8.*

*18. An image forming apparatus comprising;*

*an exposing unit;*

*a developing unit;*

*a transfer unit;*

*a fixing unit; and*
*the optical scanning apparatus according to claim 10.*

* * * * *